Patented Jan. 1, 1952

2,580,411

UNITED STATES PATENT OFFICE 2,580,411

DIHEXYL ALANINE DIALKYLAMIDES

John W. Cusic, Skokie, Ill., assignor to G. D. Searle & Co., Chicago, Ill., a corporation of Illinois No Drawing. Application October 23, 1948, Serial No. 56,257

4 Claims. (Cl. 260—561)

This invention relates to N-substituted basic alkanoamides, to salts thereof, and to methods for producing such amides and salts. More particularly this invention relates to aminoalkanoamides of the following general structural formula

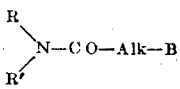

wherein R and R' are alkyl radicals containing at least four carbon atoms, Alk is a lower alkylene radical having at least two carbon atoms between the carbonyl and amino groups, and B is an organic aliphatic or aliphatic-type amino radical.

In the foregoing structural formula, R and R' represent the same or different alkyl radicals containing 4 to 8 carbon atoms. R and R' therefore are butyl, amyl, hexyl, heptyl and octyl radicals, which may be straight- or branched-chained.

The alkylene radical Alk is a bivalent hydrocarbon radical containing from 2 to 10 carbon atoms and having at least 2 carbon atoms (preferably 2 to 4) in the chain between the CO and B groupings, and represents alkylene radicals such as ethylene, propylene, butylene and amylene radicals, as well as polymethylene radicals such as trimethylene, tetramethylene, and related radicals. As used herein, lower alkylene refers to alkylene radicals containing from 2 to 10 carbon atoms.

The amino radical B represents secondary or tertiary aliphatic and aliphatic-type organic amino radicals such as mono- and dialkylamino radicals, alkanolamino and aralkylamino radicals and aliphatic-type cyclic amino radicals such as piperidino, morpholino, pyrrolidino, thiamorpholino, lupetidino, piperazino, and related amino radicals. Preferred are the lower dialkylamino radicals, viz., amino radicals bearing two alkyl substituents, the latter containing from one to five carbon atoms. When B represents a dialkylamino radical, the alkyl groups may be the same or different lower groups containing one to five carbon atoms, such as dimethylamino, dipropylamino, diamylamino, ethylmethylamino, propylmethylamino, butylmethylamino, butylethylamino, and similar dialkylamino radicals. Similarly, B can represent alkanolamino radicals such as ethanolamino, isopropanolamino, methylethanolamino, diethanolamino, methylisopropanolamino, ethylethanolamino, and related radicals. The radical B represents a non-aromatic amino radical derived from an atertiary organic amine (that is, a primary or secondary organic amine) which is aliphatic in nature and which has a basic dissociation constant in the range of $10^{-3}$ to $10^{-6}$.

Salts of the compounds which comprise this invention may be prepared by interaction with organic and inorganic acids such as hydrochloric, hydrobromic, hydriodic, sulfuric, phosphoric, citric, tartaric, acetic, benzoic, cinnamic, mandelic, maleic, malic, ascorbic, sulfamic, and similar acids which are non-toxic in therapeutic dosages. Acidic xanthines such as the 8-haloxanthines may also be used in the formation of salts. Among such xanthines are 8-chlorotheophylline, 8-bromo theophylline and 8-chlorotheobromine. Quaternary ammonium salts may be prepared of the compounds of this invention by treatment of the tertiary amino bases with a reactive ester of a strong acid. Among such esters of strong acids are methyl iodide, ethyl iodide, ethyl bromide, methyl chloride, methyl bromide, propyl bromide, benzyl chloride, benzyl bromide, phenethyl bromide, ethylene bromohydrin, propylene bromohydrin, dimethyl sulfate, diethyl sulfate, methyl p-toluenesulfonate, ethyl benzenesulfonate, and related esters. In general, the salts are soluble in water and constitute a preferred form of the invention. The organic bases are generally water-insoluble, but soluble in simple organic solvents such as alcohols, ethers, hydrocarbons, and lower ketones.

The compounds which comprise this invention are useful as pharmaceutical substances, having worth-while antispasmodic, antihistaminic, and diuretic activity. Certain of these substances are of value as surface-active agents and as antiseptics. They are furthermore of value as intermediates in the preparation of more complex organic substances for use in the preparation of pharmaceuticals and related materials. It is the object of this invention to provide materials which are useful for the foregoing purposes, as well as to provide efficient methods for their preparation.

My invention is further illustrated by the following compounds, which are exemplary of those within its scope.

A. N,N-Diamyl-β-dimethylaminopropionamide

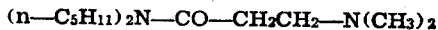

B. N,N-Diamyl-β-dipropylaminopropionamide

C. N,N-Diisobutyl-β-dimethylaminopropionamide

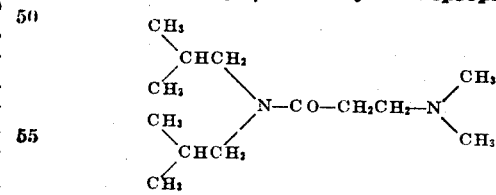

D. N,N-Dihexyl-β-dimethylaminopropionamide

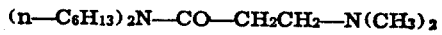

E. N,N-Di-sec-butyl-β-dimethylaminopropionamide

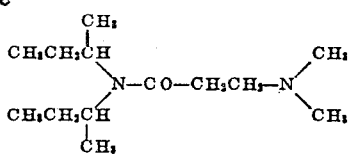

F. N,N-Diisoamyl-β-dimethylaminopropionamide

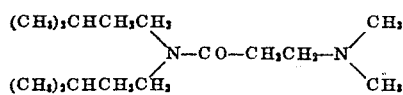

G. N,N-Dihexyl-β-diethylaminopropionamide $(n-C_6H_{13})_2N-CO-CH_2CH_2-N(C_2H_5)_2$ H. N,N-Dioctyl-β-diethylaminopropionamide $(n-C_8H_{17})_2N-CO-CH_2CH_2-N(C_2H_5)_2$ I. N,N-Dibutyl-γ-diethylaminobutyramide $(n-C_4H_9)_2N-CO-CH_2CH_2CH_2-N(C_2H_5)_2$ J. N,N-Diamyl-β-N-piperidinopropionamide

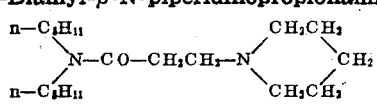

K. N,N-Dibutyl-β-N-morpholinopropionamide

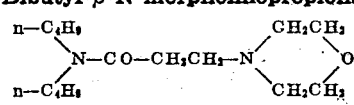

L. N,N-Dibutyl-β-dimethylaminopropionamide $(n-C_4H_9)_2N-CO-CH_2CH_2-N(CH_3)_2$ M. N,N-Dibutyl-β-diethylaminopropionamide $(n-C_4H_9)_2N-CO-CH_2CH_2-N(C_2H_5)_2$ The compounds which make up this invention can be prepared by reacting an atertiary (i. e., primary or secondary) amine of the formula RR'NH, wherein R and R' have the meanings given hereinabove, with an acid halide or an acid anhydride derived from a haloalkanoic acid of the formula X—Alk—COOH, wherein X represents a halogen, preferably a middle halogen such as bromine or chlorine, and subsequently reacting the haloalkanoamide thus formed, which has the formula X—Alk—CO—NRR', with a primary or a secondary aliphatic or aliphatic-type organic amine of the formula BH, wherein B has the meaning given hereinabove. The reaction of the secondary amine with the haloalkanoyl halide or anhydride is preferably carried out in an inert solvent such as dry benzene or toluene or dioxane, or an acid-binding solvent such as pyridine, dimethylaniline, quinoline, and the like. An excess of secondary amine is preferred if the reaction is carried out in a neutral medium. Generally at least 2 moles of secondary amine are desired, in order that there be sufficient excess amine to bind the acid liberated during the reaction. The haloalkanoamide is soluble in the organic reaction medium, and may be separated from undesired salts by filtration and evaporation. In many cases the haloalkanoamide is a crystalline substance, but it is generally unnecessary to isolate this substance in a state of purity. It can generally be reacted with the aliphatic amine in the next step in the condition in which it is obtained from the reaction mixture. In the reaction of the haloalkanoamide with the aliphatic-type amine, again it is desirable to use an excess of the aliphatic-type amine, preferably at least 2 moles of amine to 1 mole of the haloalkanoamide. The reaction is preferably carried out in an aliphatic ketone such as acetone, methyl ethyl ketone, diethyl ketone or the like. It is often advantageous to add a small amount of potassium iodide to catalyze the reaction of the haloalkanoamide. This reaction is preferably carried out at room temperature or slightly elevated temperatures, in the range of 25 to 100° centigrade. In certain instances the reaction is very rapid at room temperature, being complete within a few minutes. In other instances, heating at nearly 100° for a period of a few days may be required.

The aminoalkanoamides which result from the reaction are generally isolated by distillation under high vacuum. However, this step is not essential, and in many instances the basic amides may be obtained in crystalline form from the reaction mixture, where they may be separated with their acid addition salt, with a suitable organic acid of the type discussed hereinabove.

My invention is disclosed in greater detail in the following examples, which are provided for the purpose of illustrating the invention and which are in no way to be construed as defining or limiting the invention in spirit or in scope. Relative amounts of materials are given in parts by weight.

Example 1

A solution of 157 parts of diamylamine in 530 parts of dry ether is treated at 0° C. with a solution of 63.5 parts of β-chloropropionyl chloride in 530 parts of dry ether. The precipitate of diamylamine hydrochloride is removed and the ether is evaporated. There is thus obtained as a viscous oil N,N-diamyl-β-chloropropionamide.

A solution of 74 parts of N,N-diamyl-β-chloropropionamide, 36 parts of dimethylamine and 1 part of potassium iodide in 80 parts of methyl ethyl ketone is heated under pressure at 65° C. for 2 days. The chilled reaction mixture is dissolved in a large volume of dilute hydrochloric acid and extracted with ether. The acid solution is then made alkaline and extracted with ether. The latter ether extract is dried and evaporated. The residue of N,N-diamyl-β-dimethylaminopropionamide (Compound A) distils at 137–139° C. at 2 millimeters pressure. It forms a crystalline hydrochloride when reacted in dry ether with an absolute alcoholic solution of hydrogen chloride. This salt melts at 83–85° C.

Example 2

N,N-Diisobutyl-β-chloropropionamide is prepared as in Example 1, using 129 parts of diisobutylamine and 63.5 parts of β-chloropropionyl chloride. It is a viscous light-colored oil.

63 parts of N,N-diisobutyl-β-chloropropionamide, 40 parts of dimethylamine and 1 part of potassium iodide in 80 parts of methyl ethyl ketone are heated in a closed vessel at 65° C. for 2 days. The N,N-diisobutyl-β-dimethylaminopropionamide (Compound C) is isolated as in Example 1 and distils at 119–120° C. at 2 mm. pressure. It forms a crystalline hydrochloride melting at 147–148° C.

Example 3

A solution of 12 parts of N,N-diisobutyl-β-dimethylaminopropionamide in 80 parts of methyl ethyl ketone is treated with a stream of gaseous methyl chloride until 12 parts are absorbed. The mixture is kept at room temperature for 15 hours. The crystalline N,N-diisobutyl-β-dimethylaminopropionamide methochloride is collected on a filter, washed and dried. It is too hygroscopic for a precise melting point determination. A sample on analysis showed 12.42% N; calculated 12.71%.

Example 4

20 parts of N,N-diamyl-β-dimethylaminopropionamide and 10 parts of methyl chloride in 80 parts of methyl ethyl ketone are heated to 65° C. in a closed vessel for ½ hour. The mixture is then allowed to stand at room temperature for about 12 hours. The crystalline N,N-diamyl-β-dimethylaminopropionamide methochloride is collected on a filter and melts at 181–183° C.

Example 5

63.5 parts of β-chloropropionyl chloride and 185 parts of dihexylamine are reacted in ether as in Example 1. The N,N-dihexyl-β-chloropropionamide is a viscous oil.

A solution of 55.1 parts of N,N-dihexyl-β-chloropropionamide, 22.5 parts of dimethylamine and 1 part of potassium iodide in 80 parts of methyl ethyl ketone is heated at 65° C. in a closed vessel for 3 days. The N,N-dihexyl-β-dimethylaminopropionamide (Compound D) is isolated as in Example 1. It distils at 168–169° C. at 2 mm. pressure. It forms an oily hydrochloride which is readily soluble in water, forming a 10% solution.

Example 6

N,N-Dihexyl-β-dimethylaminopropionamide methiodide is formed from 16 parts of the basic amide and 20 parts of methyl iodide in 80 parts of methyl ethyl ketone over a period of 15 hours at room temperature. It melts at 159–160° C.

Example 7

N,N-Di-sec-butyl-β-chloropropionamide is prepared in ether from 129 parts of di-sec-butylamine and 63.5 parts of β-chloropropionyl chloride, according to the directions of Example 1. The product is a viscous oil.

81 parts of N,N-di-sec-butyl-β-chloropropionamide, 40 parts of dimethylamine and 1 part of potassium iodide in 80 parts of methyl ethyl ketone are heated at 60–70° C. for about 15 hours. The N,N-di-sec-butyl-β-dimethylaminopropionamide (Compound E) is isolated as in Example 1 and distils at 123–126° C. at 2 mm. pressure. It forms a hydrochloride which melts at 151–152° C. after recrystallization from ethyl acetate.

Example 8

A solution of 15 parts of N,N-di-sec-butyl-β-dimethylaminopropionamide and 20 parts of methyl iodide in 80 parts of methyl ethyl ketone is kept at room temperature for about 12 hours. The crystalline N,N-di-sec-butyl-β-dimethylaminopropionamide methiodide is removed by filtration, washed and dried. It melts above 260° C.

Example 9

150 parts of diisoamylamine are reacted in dry ether with 63.5 parts of β-chloropropionyl chloride. N,N-Diisoamyl-β-chloropropionamide is isolated as a thick oil.

50 parts of N,N-diisoamyl-β-chloropropionamide and 35 parts of dimethylamine in 80 parts of methyl ethyl ketone containing 1 part of potassium iodide are heated for about 14 hours in a closed vessel at 65° C. The N,N-diisoamyl-β-dimethylaminopropionamide (Compound F) is isolated as in Example 1 and distils at 137–138° C. at 2 mm. pressure. It forms a crystalline hydrochloride melting at 97–100° C.

Example 10

15 parts of N,N-diisoamyl-β-dimethylaminopropionamide and 10 parts of methyl bromide in 80 parts of methyl ethyl ketone are maintained at room temperature for about 10 hours. The crystalline N,N-diisoamyl-β-dimethylaminopropionamide methobromide is removed by filtration and dried. It melts at 187–188° C.

Example 11

A solution of 82.7 parts of N,N-dihexyl-β-chloropropionamide and 50 parts of diethylamine in 110 parts of methyl ethyl ketone containing 1 part of potassium iodide is heated at 65–70° C. in a closed vessel for 3 days. N,N-Dihexyl-β-diethylaminopropionamide (Compound G) is isolated by the method of Example 1 and distils at about 178–180° C. at 2 mm. pressure.

Example 12

50 parts of dioctylamine in 200 parts of dry ether are reacted at 0° C. with 13 parts of β-chloropropionyl chloride in 200 parts of dry ether. The precipitate of dioctylamine hydrochloride is removed and the ether is evaporated, giving a residue of oily N,N-dioctyl-β-chloropropionamide. This product is dissolved in 80 parts of methyl ethyl ketone containing 1 part of potassium iodide. Then 16 parts of diethylamine are added and the resulting solution is heated in a closed vessel at 65–70° C. for 3 days. The reaction mixture is then evaporated to remove solvent and dissolved in dilute hydrochloric acid. The acid solution is extracted with ether and subsequently made alkaline. The alkaline suspension is extracted with ether to separate the N,N-dioctyl-β-diethylaminopropionamide (Compound H). The ether is evaporated to give a residue of the basic amide as a viscous light-colored oil distilling at 208–210° C. at 1.5 mm.

Example 13

A solution of 65 parts of dibutylamine in 250 parts of dry ether is treated at ice temperature with 35 parts of γ-chlorobutyryl chloride in 200 parts of dry ether. The amine salt is removed and the ether evaporated. The residue of N,N-dibutyl-γ-chlorobutyramide is taken up in 100 parts of methyl ethyl ketone containing 1 part of potassium iodide. The solution is heated under pressure with 37 parts of diethylamine for 2 days at about 65° C. The solvent is partially evaporated and the residue is taken up in dilute hydrochloric acid. The acid solution is extracted with ether and then made alkaline with concentrated caustic soda. The alkaline suspension is extracted with ether. After drying, the ether is evaporated. The residue of N,N-dibutyl-γ-diethylaminobutyramide (Compound I) is distilled under reduced pressure; boiling point 158–162° C. at 2 mm. pressure.

Example 14

A solution of 635 parts of β-chloropropionyl chloride in 7500 parts of dry ether is added to a solution of 1292 parts of dibutylamine in 7500 parts of dry ether at 0° C. The crystalline precipitate of dibutylamine hydrochloride is removed by filtration, and the filtrate is stripped of solvent under vacuum to give a semi-solid residue of N,N-dibutyl-β-chloropropionamide.

420 parts of N,N-dibutyl-β-chloropropionamide, 250 parts of dimethylamine, 10 parts of potassium iodide, and 800 parts of methyl ethyl ketone are thoroughly mixed and heated at about 60° C. for about 15 hours in a pressure vessel. The reaction mixture is worked up as in Example 1. N,N-Dibutyl - β - dimethylaminopropionamide (Compound L) distils at 126–128° C. at 1.5 mm. pressure, and forms a hydrochloride in the usual manner, melting at 98–99° C.

*Example 15*

85 parts of N,N-dibutyl-β-chloropropionamide, 73 parts of diethylamine, 1 part of potassium iodide, and 80 parts of methyl ethyl ketone are reacted as in Example 14. The reaction mixture is worked up by the method of Example 1. N,N-Dibutyl-β-diethylaminopropionamide (Compound M) distils at 139–141° C. at 1.5 mm. pressure. The hydrochloride is made by the method of Example 1, and melts at 111–112° C.

*Example 16*

15 parts of N,N-dibutyl-β-dimethylaminopropionamide and 10 parts of methyl chloride in 60 parts of methyl ethyl ketone are reacted at room temperature for several hours. The solid precipitate of the quaternary salt is ground under methyl ethyl ketone, filtered, washed with ether and dried. N,N-dibutyl-β-trimethylaminopropionamide chloride so obtained melts at about 145° C.

I claim:

1. A member of the group consisting of an N,N - dihexyl - β - dialkylaminopropionamide and salts thereof, said N,N-dihexyl-β-dialkylaminopropionamide having the formula

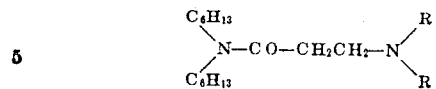

wherein R is a lower alkyl radical selected from the group consisting of methyl and ethyl radicals.

2. N,N-Dihexyl-β-dimethylaminopropionamide hydrochloride.

3. A salt of N,N-dihexyl-β-dimethylaminopropionamide.

4. A salt of N,N-dihexyl-β-diethylaminopropionamide.

JOHN W. CUSIC.

REFERENCES CITED

The following references are of record in the file of this patent:

UNITED STATES PATENTS

| Number | Name | Date |
|---|---|---|
| 2,153,707 | Becherer et al. | Apr. 11, 1939 |
| 2,191,978 | Balle et al. | Feb. 27, 1940 |
| 2,256,186 | Balle et al. | Sept. 16, 1941 |
| 2,295,655 | Hentrich et al. | Sept. 15, 1942 |
| 2,317,999 | Leuchs | May 4, 1943 |
| 2,336,179 | Leuchs | Dec. 7, 1943 |
| 2,356,587 | Hentrich | Aug. 22, 1944 |
| 2,426,891 | Lynch | Sept. 2, 1947 |
| 2,447,587 | Martin et al. | Aug. 24, 1948 |
| 2,451,436 | Erickson | Oct. 12, 1948 |

OTHER REFERENCES

Morsch, "Monatshefte für Chemie," vol. 63 (1933) pp. 234 & 235